United States Patent [19]

Vachon

[11] Patent Number: 5,274,795
[45] Date of Patent: Dec. 28, 1993

[54] PERIPHERAL I/O BUS AND PROGRAMMABLE BUS INTERFACE FOR COMPUTER DATA ACQUISITION

[75] Inventor: Guy Vachon, Austin, Tex.

[73] Assignee: Schlumberger Technology Corporation, Austin, Tex.

[21] Appl. No.: 938,553

[22] Filed: Aug. 28, 1992

Related U.S. Application Data

[63] Continuation of Ser. No. 395,767, Aug. 18, 1989, abandoned.

[51] Int. Cl.[5] .......................... G06F 5/06; G06F 13/00
[52] U.S. Cl. ............................ 395/500; 364/240.2; 364/240.3; 364/232.8; 364/242.31; 364/DIG. 1
[58] Field of Search ............................. 395/650, 700

[56] References Cited

U.S. PATENT DOCUMENTS

| | | | |
|---|---|---|---|
| 4,215,398 | 7/1980 | Burkett et al. | 395/200 |
| 4,371,925 | 2/1983 | Carberry et al. | 395/325 |
| 4,396,984 | 8/1983 | Videki, II | 395/275 |
| 4,408,291 | 10/1983 | Gunzberg et al. | 364/470 |
| 4,415,971 | 11/1983 | Guillemet et al. | 395/325 |
| 4,459,655 | 7/1984 | Willemin | 395/325 |
| 4,480,307 | 10/1984 | Budde et al. | 395/325 |
| 4,484,270 | 11/1984 | Quernemoen et al. | 395/425 |
| 4,535,403 | 8/1985 | Holland | 395/275 |
| 4,538,224 | 8/1985 | Peterson | 395/425 |
| 4,542,457 | 9/1985 | Mortensen et al. | 395/275 |
| 4,628,446 | 12/1986 | Hoffner, II | 395/275 |
| 4,628,478 | 12/1986 | Henderson, Jr. | 395/325 |
| 4,648,034 | 3/1987 | Heninger | 395/325 |
| 4,648,068 | 3/1987 | Ninnemann et al. | 395/325 |
| 4,700,292 | 10/1987 | Campanini | 395/200 |
| 4,779,093 | 10/1988 | Watkins | 340/825.57 |
| 4,787,024 | 11/1988 | Allsop et al. | 364/132 |
| 4,787,041 | 11/1988 | Yount | 395/775 |
| 4,974,144 | 11/1990 | Long et al. | 364/200 |

Primary Examiner—Gareth D. Shaw
Assistant Examiner—John Q. Chavis
Attorney, Agent, or Firm—Cox & Smith Incorporated

[57] ABSTRACT

A bus interfacing device suitable for use in computerized data acquisition systems for interfacing a main processor bus to an auxiliary peripheral bus. The operation of peripherals connected to the auxiliary peripheral bus can be controlled by either the main processor or the bus interfacing device. The device also allows data gathered from peripherals on the auxiliary bus to be stored in a dual-ported RAM for transfer in DMA-type fashion over the main processor bus.

16 Claims, 2 Drawing Sheets

PERIPHERAL I/O BUS AND PROGRAMMABLE BUS INTERFACE FOR COMPUTER DATA ACQUISITION

FIELD OF THE INVENTION

This is a continuation application of application Ser. No. 07/395,767 filed Aug. 18, 1989, now abandoned.

The present invention relates to computer input/output (I/O) buses, to devices for interfacing one bus to another, and to computerized data acquisition generally.

BACKGROUND OF INVENTION

When the first computer-based data acquisition systems were being designed, it was customary to map the hardware from where the data was to be acquired into registers in the acquisition processor's memory space. That provided a simple and intuitive interface to the processor which was capable of acquiring a word of data in one instruction cycle. As computer architectures evolved, however, the instruction cycles for processors shortened while the cycle time of acquisition buses did not. With those newer architectures, the execution time of an instruction was no longer comparable to the cycle time of an input/output ("I/O") bus. That increased the cost in terms of processor time for the processor to acquire data from peripheral hardware.

Newer computer memories are also so much faster that many modern computer architectures provide a private memory bus rather than putting the memory on the processor's I/O bus. That causes memory to become a very different device than an I/O register. An I/O access in terms of processor time then becomes far more expensive than a memory access. Any architecture that fails to distinguish between the two cannot be used to extract maximum performance from the system.

In order to reduce processor I/O processing time, peripherals have been designed with direct memory access (DMA) type interfaces. Rather than having the processor take the data from the peripherals and place it in memory, the interfaces were designed to take control of the main processor bus and directly place data into or take data out of memory with no processor involvement. DMA-type interfaces provide the highest possible memory transfer rates and reduce processor I/O processing time.

Many peripheral instruments in use today, however, not only do not have DMA capability but require processor intervention in order to gather data. Although such instruments could be redesigned so as not to require processor intervention and which would neatly package their data for the acquisition processor in blocks for DMA-type transfers, that would do little for the instruments that are already in the field and constitute a vast capital investment.

Transfer of data by peripheral devices via DMA without processor intervention, however, is especially suitable for computerized data acquisition applications. Computerized data acquisition systems can be based on what can be called a stream-type of architecture. That is, the system consists of a set of concurrently executing program modules communicating through streams of data. Data in streams provided by the peripheral devices is held in buffers which are reserved when the need arises and liberated when the data they hold is no longer needed. A memory-management system creates those buffers, keeps track of which ones contain viable data, and reallocates those whose data have expired. With the DMA mode of acquisition, the data would materialize at the top of the streams and flow through the rest of the system. There exists a need, therefore, for a means of implementing DMA in computerized data acquisition systems utilizing existing peripheral data-gathering devices without DMA capability.

Many types of data acquisition devices also require processor intervention in order to work properly, which places even further demands on the processor. For example, such processor interventions include inputs to the peripheral device to initiate data gathering and checking for completion of the data gathering operation.

Further adding to processor overhead is the fact that the data gathered from separate devices may be related, requiring the processor to manipulate the gathered data in some fashion before it is in a useful form. For example, two separate sources of data may need to interact. Processor overhead would be reduced if the data interaction could take place before being input to the processor.

SUMMARY OF THE INVENTION

The present invention is a peripheral I/O bus and programmable interfacing device for interfacing data acquisition peripherals to a main data acquisition processor. The data acquisition peripherals are connected to the peripheral I/O bus which is provided with a direct interface to the main processor bus by the interfacing device. The registers of the data acquisition peripherals may then be memory-mapped onto the main processor bus. The peripheral I/O bus is a master/slave type with the interfacing device serving as the bus master. The interfacing device translates main processor bus cycles into peripheral I/O bus cycles and vice versa. The interfacing device is also capable of transferring data between devices located on the peripheral bus as well as performing control functions for those devices requiring processor intervention. The interfacing device is also provided with a dual-ported random access memory (RAM) which is accessible by both the interfacing device and master devices located on the main processor bus, thus providing a means of communication between the main processor and the programmable interfacing device. The RAM may also be used to store data gathered by devices on the peripheral device for later transfer over the main processor bus either by normal write cycles or via DMA.

It thus is an object of the preset-it invention to provide a dedicated peripheral. I/O bus for data acquisition peripherals which is interfaced to a main processor bus.

It is also an object of the present invention to provide a programmable bus interfacing device for interfacing a main processor bus to a peripheral I/O bus.

It is a further object of the present invention for the programmable interfacing device to be capable of assuming control responsibilities for slave peripheral devices on the peripheral I/O bus and transferring data between them.

It is a further object of the present invention for the bits interface to be capable of transferring in DMA block mode data gathered from peripheral devices located on the peripheral I/O bus to the main processor bus.

These and other objects, features and advantages of the present invention will become evident to those skilled in the art upon a reading of the following detailed description of the preferred embodiment taken in conjunction with the accompanied drawings and claims.

DETAILED DESCRIPTION OF THE PREFERRED EMBODIMENT

Figure 1:
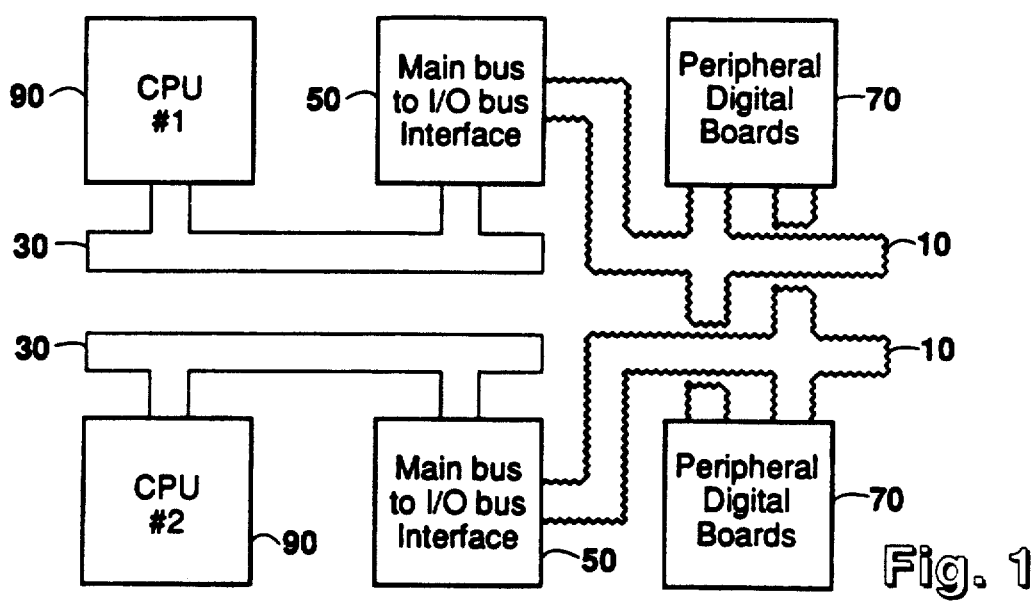
FIG. 1 is a schematic of a computerized data acquisition system utilizing the peripheral I/O bus.

FIG. 1 is a schematic representation of a computerized data acquisition system employing a peripheral I/O bus in accordance with the present invention. Owing to its simplicity, the peripheral I/O bits 10 is extensible so that peripheral data acquisition devices 70 which interface to it may be located physically distant from the rest of the system without performance degradation. The peripheral I/O bus 10 is interfaced to the main processor bus 30 via a bus interfacing device 50. Connected to the main processor bus 30 is a main data acquisition processor 90 along with associated peripherals. In the particular embodiment shown, all of the components are made redundant with the two peripheral I/O buses directly interconnected.

The peripheral I/O bus 10 described herein is a single-master/multiple-slave bus. The peripheral I/O bus 10 is interfaced to the main processor bus 30 by an intelligent bus interfacing device used as a main bus to I/O bus interface and referred to herein as the bus master 50. The peripheral I/O bus 10 presents a general interrupt and a simple address/data interface to the system. The registers of the data acquisition peripherals are memory-mapped onto the main processor bus 30. The bus master 50 translates the main processor bus cycles into peripheral bus cycles and vice versa. Higher-order bus functions such as read-modify-write cycles and DMA are also implemented by the bus master 50.

Figure 2:
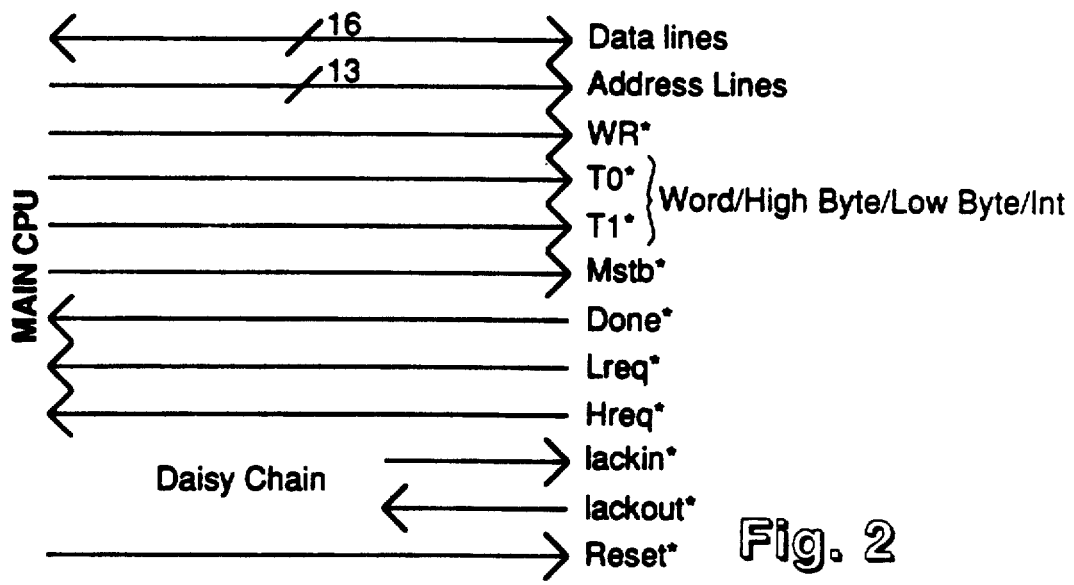
FIG. 2 is a schematic of the peripheral bus in accordance with the present invention.

Referring to FIG. 2, the structure of the peripheral I/O bus 10 in accordance with a particular embodiment will now be described. Address lines ADDR(1-13) convey address information from the bus master to all of the slaves sitting on a peripheral I/O bus. The address range of the 13 address lines is eight kilowords. Data lines DATA(1-16) carry data bidirectionally between the main processor bus 30 and the slave data acquisition peripherals 70.

The remaining lines of the peripheral I/O bus 10 are control lines. The WR line will be low during a read cycle and high during a write cycle. The T0/T1 signals differentiate the types of accesses according to whether a complete word, a low byte or a high byte is to be accessed or an interrupt is being acknowledged. The MSTB signal is a strobe signal for the peripheral I/O bus and is activated after all the control data and address lines are valid and stable. The MSTB signal is not activated until all signals have settled on the bus and the slaves have had time to decode the address and control lines. The DONE signal is activated by a slave to signal that it is done with a transaction. The DONE signal signals the bus master 50 that it may proceed to read the data on the bus. The DONE and MSTB signals are interlocked so that the time required by a transaction depends on how fast the slave can respond to it.

The bus master 50 requires that its slaves activate DONE signal within a specified time after detecting the MSTB signal. That mechanism is used to erasure detection of unhealthy or nonexistent peripheral I/O bus slaves. The fact that some peripheral I/O bus cycles may be independent of main processor bus activity must be considered in order to arrive at the specific time-out value. That is, the bus master may also initiate peripheral bus cycles. A potential problem arises when the main processor attempts to communicate with the peripheral I/O bus and the main processor bus cycle begins immediately after such a peripheral I/O bus cycle begins. In order to guarantee that the peripheral I/O bus-related cycle will complete in time for the main processor bus-related cycle to take place before the latter's time-out expires, a complete peripheral I/O bus cycle must never be more than half the time-out value of the main processor bus. From this value should also be subtracted protocol, propagation and master overhead to give a time period in which the slave must act before a time-out occurs.

The two interrupt lines HREQ and LREQ provide two types of interrupts which the data acquisition peripherals 70 may generate. The peripherals 70 are daisy-chained such that certain peripherals will inherently have higher priority than the others. The interrupt acknowledge IACKIN/IACKOUT lines are used to propagate the active low acknowledge through the daisy-chain. HREQ is the host interrupt request generated by a slave device 70 when the slave device must interrupt the main processor. The HREQ request is acknowledged only after the main processor bus 30 has accepted the interrupt signal generated by the bus master 50 for the slave device. LREQ is the local interrupt request generated by a slave device to interrupt the bus master 50, and is acknowledged as soon as the bus master receives the request. The interrupt vector is transmitted over the peripheral I/O bus oil a cycle similar to a read cycle along with the acknowledge signal to inform the bus master 50 which interrupt has occurred. One of the address lines ADDR1 is used to indicate whether a lost or local interrupt request is being acknowledged. The bus master 50 would then translate that signal to an adequate interrupt signal for the main processor 90.

The RESET line is used to place all slave devices 70 on the peripheral I/O bus on a known state. Two different reset functions may be provided. A soft reset waits until the bus cycle in progress concludes before causing the slave devices to change to the known state. A hard reset disregards the current state of the bus and immediately causes its effects. There is no difference between a soft and a hard reset if they are activated while the peripheral I/O bus is quiescent. The bus master is responsible for activating either reset and keeps track of when the peripheral I/O bus is quiescent and when it is not. If it receives a soft reset request, the bus master 50 will complete the current cycle and then activate the RESET signal. If a hard reset request is received, the bus master 50 will activate the RESET signal immediately. Therefore, the bus master 50 takes care of the two different kinds of resets and only one signal line is used on the bus for a reset.

Figure 3:
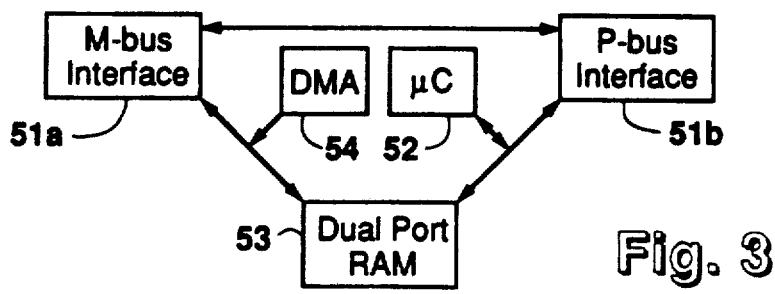
FIG. 3 is a schematic of the bus master.

Referring to FIG. 3, the intelligent bus interfacing device, or bus master 50, comprises a main processor bus interface 51a, a peripheral I/O bus interface 51b, a programmable microcontroller 52, a dual-ported RAM 53 that can be accessed either by the main processor bus interface 51a or the microcontroller 52 via the microcontroller bus 92, and a DMA counter 54 used in transferring some of the contents of the dual-ported RAM to the main processor bus in block mode DMA. The main processor bus and peripheral bus interfaces 51a and 51b are interconnected so that a main processor bus cycle to the peripheral bus can be translated without intervention from the rest of the circuit. The dual-ported RAM 53 and the peripheral I/O bus interface 51b are interfaced via the microcontroller bus 92. The microcontroller 52 has access to both the dual-ported RAM 53 and the peripheral I/O bus interface 51b and controls transfers between them. The main processor bus interface 51a has read/write access to any location on the dual-ported RAM 53. The DMA counter 54 latches the starting address in which it is desired to transfer data to or from anywhere in the main processor bus address space to or from a designated memory block in the dual-ported RAM 53 and automatically increments during the DMA cycle. The DMA operation is set up and managed by the microcontroller 52 so transfers of varying size can be arranged between any two destinations.

The bus master 50 supports two mechanisms for interrupting the main processor. Peripheral devices 70 on the peripheral I/O bus 10 can interrupt the main processor 90 using the host interrupt mechanism of the peripheral I/O bus described above. Those interrupts have fixed vectors as they are passed straight through. The microcontroller 52 is also capable of interrupting the main processor 90. The interrupt vector for this latter interrupt is stored on the dual-ported RAM 53 and hence is programmable. The main processor 90 is also capable of interrupting the microcontroller 52 by writing into specific locations in the dual-potted RAM 53.

Figure 4:
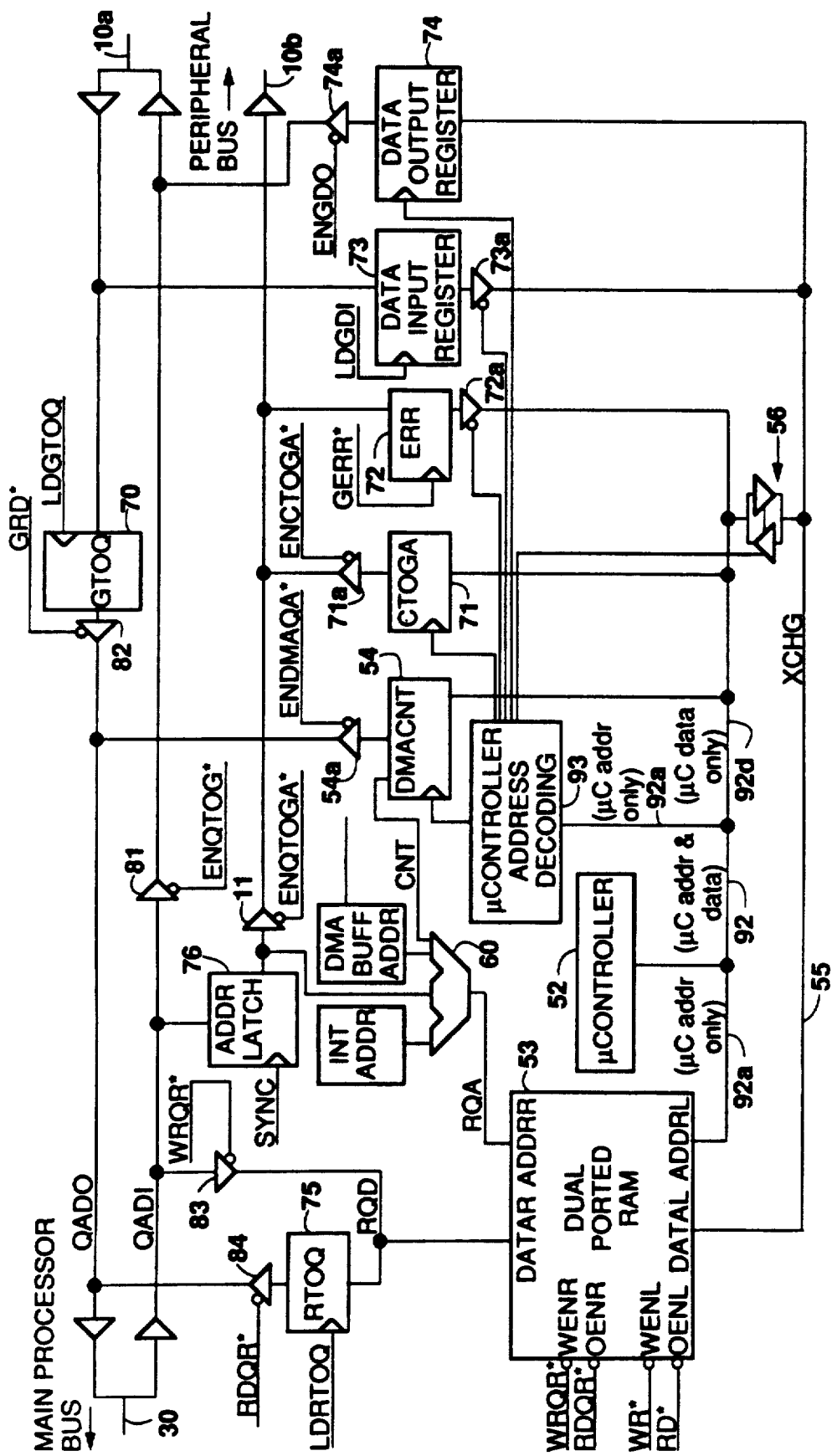
FIG. 4 is a more detailed schematic of the bus master.

A more detailed schematic of the bus master 50 is given in FIG. 4. In the description that follows, reference will be made to control signals generated by external logic circuitry which control the operation of the bus master 50. The external circuitry generates those signals by methods well-known to those of ordinary skill in the art in response to certain conditions as will be described.

One of the functions performed by the bus master 50 is enabling the translation of main processor bus 30 cycles into peripheral bus cycles and vice versa. External logic circuitry responsive to signals received from both the main processor bus 30 and the peripheral bus 10 generates control signals at the appropriate time to enable the passage of address and control signals from the main processor bus to the peripheral bus as well as the bidirectional passage of data signals between the two buses by enabling tri-state buffer amplifiers interposed between the two buses. In the particular embodiment shown, the main processor bus 30 uses common lines for data and address by time multiplexing. Buffered connections between the bus master 50 and both the peripheral bus 10 and the main processor bus 30 are provided as shown in FIG. 4. Address signals from the main processor bus 30 are latched upon assertion of the SYNC pulse into address latch 76. SYNC is a signal generated by the main bus signifying that an address (rather than data) is being sent over the bus. If, during a main processor bus read or write cycle, the address is within the address range of the peripheral bus, the ENQTOGA signal is asserted by external circuitry to enable tri-state buffer 11 and pass the address to the address lines 10b of the peripheral I/O bus 10. Data signals from the main processor bus 30 during a write cycle are passed straight through to the data lines 10a of the peripheral I/O bus 10 when buffer 81 is enabled by the assertion of the ENQTOG signal, the latter signal being generated similarly to the ENQTOGA signal. During a read cycle, data from the peripheral I/O bus 10a is latched in data latch 70 by the assertion of the LDGTOQ signal. The LDGTOQ signal is generated after the completion of a peripheral bus read cycle initiated by a main processor bus cycle. The GRD signal is generated similarly to enable buffer 82 and pass the data through to the main processor bus 30 via tri-state buffer 82. Thus the bus master 50 allows direct access to the peripheral I/O bus 10 by the main processor bus 30. The main processor bus 30 may also access the dual-ported RAM 53. The address of the location to be accessed is first latched in address latch 76 as described above for a peripheral bus access and passed by multiplexer 60 to the ADDRR port of dual-ported RAM 53. During a write cycle, data from the main processor bus 30 is then written directly into the addressed location via the port labeled DATAR. The WRQR signal is asserted during main processor bus write cycles whenever the address is within the address range of the dual-ported RAM 53 to enable buffer 83 and serve as the write-enable (WENR) input to the RAM 53. During a read cycle, data front the addressed location in the dual-ported RAM 53 is latched in data latch 75 by the LDRTOQ signal and passed to the main processor bus 30 by buffer 84. The RDQR signal is asserted during main processor bus read cycles whenever the address is within the address range of the dual-ported RAM 53 to enable buffer 84 and serve as the output enable (OENR) input to the RAM 53. The LDRTOQ signal, which latches the data into data latch 75, is asserted at the beginning of the cycle whenever RDQR is asserted.

The dual-ported RAM 53 is also accessible by the microcontroller 52 via microcontroller bus 92. The RAM 53 can thus serve as a means for communication between the main processor and the microcontroller 52. For the purposes of this description, it will be assumed that the term "microcontroller" includes a memory (e.g., a read-only memory or ROM) for containing executable code. Alternatively, of course, the microcontroller 52 could execute instructions stored in the dual-ported RAM 53. The microcontroller bus 92 in this embodiment is an 8-bit data bus 92d with a 16-bit address bus 92a. As shown in FIG. 4, only the address lines 92a are connected to the address port ADDRL of the dual-ported RAM 53. Data may flow to and from addressed locations of the RAM 53 via data port DATAL to which is connected a 16-bit exchange bus 55. The WR signal from the peripheral bus and its inverse are used as the write-enable and output-enable inputs, respectively, to the RAM 53. The exchange bus 55 communicates with the microcontroller data bus 92d via bidirectional tri-state buffer 56. When the microcontroller 52 accesses the dual-ported RAM 53, an address of a specific location in the RAM is put on the microcontroller address bus 92a. The size of the dual-ported RAM 53, however, is chosen so as not to need all 16 bits of the microcontroller address bus 92a to completely specify the address space of the RAM. One of the extra bits of the address field is then used by microcontroller address decoder 93 to specify the source or destination of the data to be written to or read from, respectively, the dual-ported RAM 53. When data is read from RAM 53 by the microcontroller 52, address decoder 93 either enables bidirectional buffer 56, which sends the data to an internal register of the microcontroller, or latches the data in data register 74. Data in data register 74 may then be sent out over the peripheral bus 10. In a preferred embodiment, a peripheral bus write cycle is automatically initiated by external circuitry when a peripheral bus address is written into 16-bit address register 71 by the microcontroller. Since the address space of the peripheral bus is only 13 bits, one of the extra bits in the address field can be used to signify whether a read or a write peripheral bus cycle should be initiated. The address decoder 93 provides the latching transition when the address of the address register 71 is present on the microcontroller address bus 92a during the write operation to the address register 71. The ENGDO signal is asserted by external circuitry during the peripheral bus write cycle to enable buffer 74a. When data is to be written into RAM 53 by the microcontroller, ail extra bit of the address field is used to either enable bidirectional buffer 56, causing the data's source to be an internal register of the microcontroller, or to enable buffer 73a, causing the source to be data register 73. Data may be read into data register 73 from the peripheral bus 10 by writing a peripheral bus address into address register 71 which automatically initiates the peripheral bus read cycle, again using one of the extra bits in the address field to specify a read as opposed to a write. During the read cycle, the LDGDI signal is asserted by external circuitry to latch the data into register 73. During both read and write peripheral bus cycles, the ENCTOGA signal is asserted to enable buffer 71a and pass the contents of the address register 71 out onto peripheral address bus 10b. Thus, using address register 71, data input register 73 and data output register 74, the bus master is able to move data between devices located on the peripheral bus 10, as well as move data to and from the dual-ported RAM.

DMA between the dual-ported RAM 53 and the main processor bus 30 may also be accomplished. The DMA operation is initiated by the main processor by writing into a predetermined location in the dual-ported RAM which is read by the microcontroller 52. The information in the predetermined location contains the size of the DMA block to be transferred as well as the starting address on the main processor bus 30 which is to be read from or written to. The bus master 50 then initiates the DMA operation according to the particular protocol of the main processor bus 30. Before the DMA operation begins, the microcontroller 52 writes the starting address of the location to be accessed on the main processor bus 30 into a first counter within DMA counter 54. Multiplexer 60, also under control of the microcontroller 52, is configured so as to pass the starting address of the DMA block in the dual-ported RAM which is the signal labeled FNUM appended to another four-bit signal generated by a second counter within DMA counter 54, CNT. Both the main processor bus address contained in DMA counter 54 and CNT are sequentially incremented during the DMA operation. The RDQR, WRQR and LDRTOQ signals are also asserted as described above with respect to accesses of the dual-ported RAM 53 by the main processor bus 30. The ENDMAQA signal is asserted during this operation to enable buffer 54a.

In the event of a failure of a slave on the peripheral I/O bus 10 to respond during an access cycle by either the main processor bus 30 or the microcontroller 52, the address, T0, T1 and WR lines are latched into error latch 72 after a specified time-out interval. The latched signal thus contains the address attempted to be accessed, along with the byte specification, and also signifies whether the cycle type was a read or a write.

Three kinds of interrupts are supported by the bus master 50. The fit-st is where the microcontroller 52 interrupts the main processor. In that case, the multiplexer 60 is switched so as to admit the signal labeled INTADDR which accesses that particular location in the dual-ported RAM 53. The interrupt vector, corresponding to a particular kind of interrupt, is written into the location having the address INTADDR which causes the interrupt to be requested on the main processor bus 30. The interrupt vector is then passed via data latch 75 to the main processor bus 30. Slaves on the peripheral I/O bus 10 may also interrupt the main processor directly. When the interrupt is acknowledged, the slave then sends the interrupt vector to the main processor bus 30 via data latch 70. The third kind of interrupt is where a peripheral I/O bus slave interrupts the microcontroller 52. As noted above, this takes place when the slave device asserts the LREQ line. The interrupt is acknowledged by the microcontroller 52 writing into address latch 71.

The bus master 50 thus serves the dual purpose of translating main processor bus cycles into peripheral I/O bus cycles as well as implementing higher acquisition functions like DMA. The flexibility of the bus master 50 may also be utilized to make devices on the peripheral I/O bus 50 look different to the main processor.

An exemplary application of the present invention ill a well-logging data acquisition system will now be described. In such a system, data from the well-logging tool located down-hole is transmitted via a telemetry system to the surface. A separate depth system typically keeps track of the depth down-hole of the well-logging tool. Both the telemetry system and the depth system are interfaced to the peripheral I/O bus 10. The microcontroller 52 may be programmed to read depth from the depth system and then write that depth to the telemetry system at specified time intervals. In this way, the separate telemetry and depth systems can be made to look like a combined telemetry/depth system without any intervention by the main processor.

In other applications, data acquisition instrumentation which requires processor intervention on the peripheral I/O bus 10 may be controlled by the microcontroller 52. The data can then be read and written into dual-ported RAM 53. The data in the dual-ported RAM 53 is then DMAed out or simply read by the main processor which is relieved of responsibility for controlling the operation of the data acquisition instrument (e.g., starting an analog-to-digital conversion and checking for completion of the operation before reading the data).

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

What is claimed is:

1. An apparatus for interfacing a processor, having an associated memory, and processor bus to a peripheral bus and peripheral devices, wherein the bus cycle timing of said processor bus is different from the bus cycle timing of said peripheral bus, comprising:

a processor bus interface means for translating said processor bus cycles into said peripheral bus cycles to allow the transfer of address, control, and data signals generated by said processor directly from said processor bus to said peripheral bus;

a peripheral bus interface means for translating said peripheral bus cycles into said processor bus cycles to allow the transfer of peripheral device data signals gathered by said peripheral devices from said peripheral bus directly to said processor bus;

a memory means coupled to both said processor bus interface means and said peripheral bus interface means for storing peripheral device data signals and processor address, control, and data signals not directly transferred between said processor and peripheral buses;

a microcontroller means coupled to said memory means and said peripheral bus interface means for controlling data transfers between said memory means and said peripheral devices, said microcontroller means further controlling the DMA transfer of processor data from said processor memory through said processor bus interface means to said memory means and peripheral device data stored in said memory means from said memory means through said processor bus interface means to said processor memory.

2. The apparatus according to claim 1, said memory means comprising a dual-ported RAM having first address and data ports coupled to said process bus interface means via a direct access bus, a second address port coupled to said microcontroller means via a microcontroller bus and a second data port coupled to said peripheral bus interface means via an exchange bus.

3. The apparatus according to claim 2, wherein said microcontroller bus and said exchange bus communicate through a bidirectional tri-state buffer.

4. The apparatus according to claim 3, said processor bus interface means, comprising:

an address latch coupled to said processor bus via a first buffer means, wherein said address latch latches address information received from said processor;

a second buffer means positioned between said address latch and said peripheral bus to allow transfer of said address information to said peripheral bus if said address information is within an address range of said peripheral devices; and a third buffer means positioned between said first buffer means and said peripheral bus to allow direct transfer of data from said processor bus to said peripheral bus.

5. The apparatus according to claim 4, said processor bus interface means, further comprising a multiplexer positioned between said address latch and said dual-ported RAM to allow transfer of said address information to said dual-ported RAM if said address information is within the address range of said dual-ported RAM.

6. The apparatus according to claim 5, said processor bus means, further comprising a fourth buffer means positioned between said first buffer means and said dual-ported RAM to allow direct transfer of data from said main processor bus to said dual-ported RAM.

7. The apparatus according to claim 6, said processor bus interface means, further comprising:

a first data latch coupled to said dual-ported RAM to latch data sent from said dual-ported RAM to said processor; and a fifth buffer means positioned between said data latch and said processor bus to allow transfer of said data latched in said data latch to said processor bus.

8. The apparatus according to claim 7 wherein said microcontroller means is operable to read instructions from said processor bus written into said dual-ported RAM.

9. The apparatus according to claim 8 wherein said microcontroller means is operable to send instructions to the peripheral bus interface means for transferring data from a first peripheral device connected to said peripheral bus to either a second peripheral device or said dual-ported RAM.

10. The apparatus according to claim 9, said peripheral bus interface means, comprising:

a second data latch coupled to said peripheral bus via a sixth buffer means, wherein said second data latch latches data received from said peripheral devices; and a seventh buffer means positioned between said second data latch and said processor bus to allow transfer of said data from said second data latch to said processor bus.

11. The apparatus according to claim 10, said peripheral bus interface means further, comprising:

a data output register coupled to said dual-ported RAM via said exchange bus for storing data received from said dual-ported RAM; and a eighth buffer means positioned between said data output register and said peripheral bus to allow transfer of said data stored in said data output register to said peripheral bus.

12. The apparatus according to claim 11, said peripheral bus interface means, further comprising:

a data input register coupled to said peripheral bus for storing data received from said peripheral devices via said peripheral bus; and a ninth buffer means positioned between said data input register and said dual-ported RAM to allow transfer of said data stored in said data input register to said dual-ported RAM via said exchange bus.

13. The apparatus according to claim 12, said peripheral bus interface means, further comprising:

an error latch coupled to said peripheral bus for latching peripheral bus address and control signals in response to a peripheral device failure; and a tenth buffer means positioned between said error latch, said microcontroller means and said dual-ported RAM on said microcontroller bus to allow transfer of said peripheral bus address and control signals to said microcontroller means and said dual-ported RAM.

14. The apparatus according to claim 13, said microcontroller means, comprising:

a microcontroller for controlling data transfer between said peripheral devices and said dual-ported RAM;

an address register, wherein the writing of a peripheral bus address into said address register initiates either a peripheral bus read or write cycle according to the state of an extra bit in the address field and further wherein the data written into or read from the location having the address stored in said address register is either written from said data output register or read into said data input register, respectively; and an address decoder, wherein the assertion of a dual-ported RAM address over the microcontroller bus is decoded by said address decoder such that during a read cycle, the data from the addressed location is read either into an internal register of said microcontroller or into said data output register according to the state of an extra bit in the microcontroller address field, and further such that, during a write cycle, data is written into the addressed location from either an internal register of said microcontroller or said data input register according to the state of an extra bit in the microcontroller address field.

15. The apparatus according to claim 14 wherein said microcontroller is capable of interrupting said processor with a programmable interrupt vector stored in said dual-ported RAM.

16. The apparatus according to claim 15 wherein said microcontroller is interrupted when a specific location in said dual-ported RAM is written into by said processor.

* * * * *